UNITED STATES PATENT OFFICE.

ARTHUR H. WILLIAMS, OF MANCHESTER, NEW HAMPSHIRE.

BLACKBOARD COMPOUND.

SPECIFICATION forming part of Letters Patent No. 392,482, dated November 6, 1888.

Application filed May 12, 1888. Serial No. 273,661. (No specimens.)

*To all whom it may concern:*

Be it known that I, ARTHUR H. WILLIAMS, a citizen of the United States, residing at Manchester, in the county of Hillsborough and State of New Hampshire, have invented certain new and useful Improvements in Blackboard Compounds; and I do hereby declare the following to be a full, clear, and exact description of the invention, such as will enable others skilled in the art to which it appertains to make and use the same.

My invention has reference to an improved mixture for a blackboard or marking surface; and it consists in a blackboard or marking surface composed of certain ingredients, substantially as will be described and then claimed.

One of the constituents of my blackboard composition is Francestown soapstone, which is quarried at Francestown, New Hampshire, and which differs chemically from the ordinary soapstone or talc in that the latter contains no oxide of aluminium ($Al_2O_3$) which is contained in Francestown soapstone to the extent of ten per cent., and also talc has fifteen per cent. more silica ($SiO_2$) than Francestown soapstone, which contains about forty-five per cent. of silica.

My improved blackboard also comprises cement, either Portland or Keene, lime-putty, a black coloring-matter, and ordinary sand. The ingredients just enumerated are commingled in the following proportions: One part Francestown soapstone, one part cement, one part lime-putty, one part black coloring-matter, and four parts of sand. These are thoroughly mixed, and to five parts of the mixture is added one part of plaster-of-paris. The composition thus obtained is applied to the wall in any desirable manner.

The blackboard surface produced by the use of this coating is hard, smooth, and even, but not glossy. It can be washed without injury and crayon marks can be easily and completely erased. There are no seams or joints and no scaling or wearing off occurs.

Having thus described my improvement in blackboard surfaces or compositions, what I claim as new, and desire to secure by Letters Patent, is—

1. A blackboard or marking surface composed of cement, lime-putty, black coloring-matter, sand, plaster-of-paris, and a soapstone containing some ten per cent. of oxide of aluminium and some forty-five per cent. of silica, substantially as described.

2. A blackboard or marking surface composed of one part of plaster-of-paris and five parts of a mixture of soapstone containing ten per cent. of oxide of aluminium and some forty-five per cent. of silica, (one part,) cement, (one part,) lime-putty, (one part,) black coloring-matter, (one part,) and sand, (five parts,) substantially as described.

In testimony whereof I affix my signature in presence of two witnesses.

ARTHUR H. WILLIAMS.

Witnesses:
C. H. BARTLETT,
C. A. WILLIAMS.